United States Patent Office 3,457,272
Patented July 22, 1969

3,457,272
4-(o-BENZOYLSULFIMIDO)LOWER
FATTY AMINES
Leonard Robert Crook, West Ashling, near Chichester, Alexander Bertus Arnold Jansen, Burnham, Kenneth Eric Vincent Spencer, Emsworth, and David Harris Watson, Audenshaw, England, assignors, by mesne assignments, to John Wyeth & Brother Limited, Maidenhead, England, a British Company
No Drawing. Filed Mar. 1, 1965, Ser. No. 436,353
Claims priority, application Great Britain, Mar. 3, 1964, 9,022/64
Int. Cl. C07d 91/26, 51/46; A61k 27/00
U.S. Cl. 260—301
15 Claims

ABSTRACT OF THE DISCLOSURE

A diverse group of N-substituted imides of carbocyclic dibasic acids is disclosed which have CNS action as hypnotics, sedatives, muscle relaxants, and/or anti-convulsants. These compounds may be viewed as derivatives or relatives of γ-aminobutyric acid and have the formula

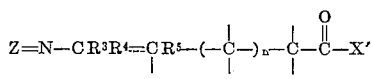

where the group Z=N— may be

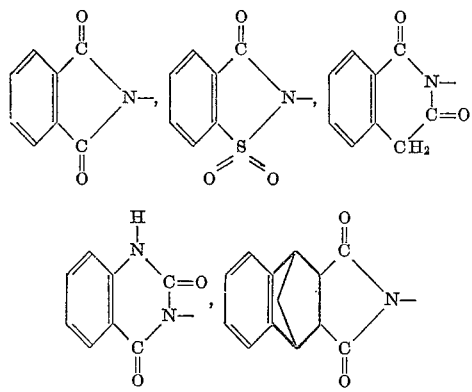

or such radicals reduced in the aromatic ring or at one carbonyl group or substituted in the aromatic ring by from 1 to 4 alkyl, aryl, alkoxy, nitro, amino, or halo substituents, $R^3$, $R^4$, $R^5$, are hydrogen, alkyl or aryl groups of not more than 10 carbon atoms, $n=0$ or 1, the group

is a carboxylic ester or a carboxylic acid secondary or tertiary amide, and the group

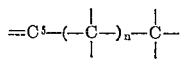

is an alkylene or alkenylene group in which the free valencies are satisfied by hydrogen.

---

This invention relates to certain aminoalkylcarboxylic amide compounds and aminoalkylcarboxylic ester compounds, to pharmaceutical compositions containing them, to processes of preparing such compounds and to processes of preparing the pharmaceutical compositions.

γ-aminobutyric acid occurs in the central nervous system of mammals and is believed to exert a marked effect on the physiological activity of the mammalian brain. The acid itself is of no value as a pharmaceutical, for whatever the effect of its administration to the brain might be, direct administration to the brain is impracticable and its transference from the blood stream to the brain so as to increase its concentration in the brain is prevented by the blood brain barrier.

In accordance with the invention the γ-aminobutyric acid molecule can be modified to produce compounds which, when introduced into the blood stream of mammals, and in certain cases orally, are carried to the brain and there exert a marked action on the central nervous system. This action shows itself in a variety of ways, depending upon the precise structure of the compound concerned. Many of the compounds are especially interesting pharmacologically because they show intense activity in the central nervous system; unaccompanied by peripheral effects, and in certain cases the compounds show a low toxicity.

Many of the compounds are hypnotics or sedatives. Yet again others show muscle relaxant properties, others show anticonvulsant activity and others potentiate the action of other sedative pharmaceutical materials, for instance the barbiturates. In general these effects are exhibited in experimental animals.

Thus, the invention provides an aminoalkylcarboxylic amide having the formula:

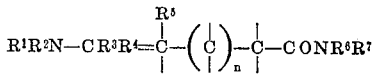

where $R^1$ is acyl or alkyl, $R^2$ is acyl or an organic sulphonyl group, $R^3$, $R^4$ and $R^5$ are hydrogen, alkyl or aryl groups of not more than 10 carbon atoms, $n=0$ or 1, $R^6$ is alkyl or aryl, $R^7$ is hydrogen or alkyl; and where the group

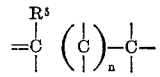

is an alkylene or alkenylene group in which the free valencies are satisfied by hydrogen.

The invention also provides an aminoalkylcarboxylic ester having the formula:

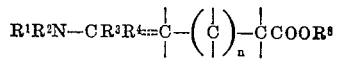

where $R^1$ is acyl or alkyl, $R^2$ is acyl or an organic sulphonyl group, $R^3$ and $R^4$ are hydrogen or alkyl or aryl groups of not more than 10 carbon atoms, $n=0$ or 1 and $R^8$ is an alkyl group; where the group $R^1R^2N$— is a cyclic imide, imidine, sulphonimide or sulphonimidine group; where the group

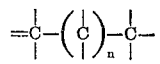

is an alkylene or alkenylene group in which the free valencies are satisfied by hydrogen; and where the ester contains at least 15 carbon atoms when the group $R^1R^2N$— is unsubstituted phthalimido or 3-(4(3)-quinazolonyl).

The invention furthermore provides a pharmaceutical composition containing the aforementioned aminoalkyl carboxylic amide and/or the aforementioned aminoalkyl carboxylic ester in association with a pharmaceutically acceptable carrier. It also provides a process of producing such a pharmaceutical composition wherein an aminoalkyl carboxylic amide or an aminoalkyl carboxylic ester as aforementioned is put into medicinally acceptable form, e.g., by mixing, with a pharmaceutically acceptable carrier.

The terms alkyl and aryl group used herein are to be understood to include substituted alkyl and substituted aryl groups and such groups which are unsaturated. Thus, examples of alkyl groups are methyl, ethyl, propenyl, but- 2-enyl, chloropentyl, cycloalkyl, e.g., cyclohexyl and aralkyl groups, e.g., benzyl. Examples of aryl groups are phenyl, tolyl, xylyl, chlorophenyl and styryl groups. The terms "lower alkyl" or "lower aryl" connote alkyl groups having up to 6 carbon atoms and aryl groups having up to 8 carbon atoms respectively; derivatives such as "lower alkoxy" have a corresponding connotation.

For brevity the terms "saccharimide" or o-benzoylsulfimido are applied to compounds containing the moiety:

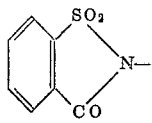

and such compounds are named accordingly in the examples herein.

The aforementioned compounds are to be considered to include their salts when such are formed.

The aforementioned aminoalkyl carboxylic amides and aminoalkyl carboxylic esters are preferably those in which $R^1$ is acyl and $R^2$ is acyl or an organic sulphonyl group; it is particularly preferred that the group $R^1R^2N-$ is a cyclic imide, imidine, sulphonimide or sulphonimidine group since enhanced activity on the central nervous system is in general shown by such compounds. Thus the group $R^1R^2N-$ can be a phthalimido or saccharimido group which may be unsubstituted or substituted, for instance at any of the positions of the benzene ring thereof by one or more alkyl, alkoxy, nitro, amine or halogen groups. It is preferred that substitution is by one or two lower alkyl and/or lower alkoxy groups; also it is preferably at the 3 and 6 positions of the benzene ring.

In a useful variant a carbonyl group of the phthalimido or saccharimido group may be replaced by a $-CH_2-$ group to give a phthalimidino or saccharimidino group.

The aminoalkyl carboxylic amide or aminoalkyl carboxylic ester may be derived from butyric acid in which case $n=0$ or valeric acid in which case $n=1$. It is preferred that a butyric or valeric chain between the terminal nitrogen atom and the terminal carboxylic group at the other end is unsubstituted in the position beta to the nitrogen atom, i.e. $R^5=H$; when the said chain is substituted by such a beta substituent $R^5$, it is preferred that this is a lower alkyl group, particularly a methyl group.

It is preferred, in order to obtain the higher central nervous system activities, that of the substituents next to the nitrogen atom there is only one or no substituent, it is preferred that if such a substituent is present that it is an alkyl group and particularly preferred that it is an unsubstituted lower alkyl group. For highest activities it is preferred that $R^3$ is a methyl or ethyl group.

When the compound is an aminoalkyl carboxylic amide the group $-CONR^6R^7$ is preferably a carboxylic dialkylamide group, particularly a di-lower unsubstituted alkylamide as the higher central nervous system activities are thereby obtained. Likewise in the case of the aminoalkyl carboxylic esters it is preferred that $R^8$ is a lower alkyl group.

In general the aminoalkyl carboxylic amides and aminoalkyl carboxylic esters of the invention can be prepared without difficulty by the application of standard reactions to appropriate intermediates.

A pharmaceutical composition of the invention comprises an aminoalkyl carboxylic amide or ester in association with a pharmaceutically acceptable carrier, which can be either solid or liquid. Solid form compositions include powders, tablets, dispersible granules, capsules, cachets, and suppositories. A solid carrier can be one or more substances which may also act as flavouring agents, lubricants, solubilizers, suspending agents, binders, or tablet-disintegrating agents: it can also be an encapsulating material. In powders the carrier is a finely divided solid which is in admixture with the finely divided active ingredient. In tablets the active ingredient is mixed with carrier having the necessary binding properties in suitable proportions and compacted in the shape and size desired. The powders and tablets preferably contain from 5 to 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly, cachets are included.

Liquid form compositions include solutions, suspensions emulsions, syrups and elixirs. The active ingredient can be dissolved or suspended in a pharmaceutically acceptable liquid carrier, such as water, an organic solvent or a mixture of both. Preferably a liquid carrier is one suitable for parenteral injection so that the composition can be made a sterile one suitable for injection. Where the active ingredient is sufficiently soluble it can be dissolved in normal saline as a carrier: if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely divided active ingredient in aqueous starch or sodium carboxymethyl cellulose solution, or in a suitable oil, for instance arachis oil. Liquid pharmaceutical compositions which are sterile solutions or suspensions can be utilized by intramuscular, intraperitoneal or subcutaneous injection. In many instances a compound is orally active and can be administered orally either in liquid or solid composition form.

Preferably the pharmaceutical composition is in unit dosage form. In such form, the composition is sub-divided in unit doses containing appropriate quantities of the active ingredient: the unit dosage form can be a packaged composition, the package containing discrete quantities of composition, for example packeted powders or vials or ampoules. The unit dosage form can be a capsule, cachet or tablet itself, or it can be the appropriate number of any of these in packaged form. The quantity of active ingredient in a unit dose of composition may be varied or adjusted from 5 mg. or less to 5 g. or more, according to the particular need and the activity of the active ingredient. The invention also includes the compounds in the absence of carrier where the compounds are in unit dosage form.

The invention is illustrated by the following examples, in which all temperatures are in ° C. Unless otherwise stated, the pharmaceutical compositions referred to in the examples were administered by intraperitoneal injection. They had concentrations of the active ingredient in the range 12.7 to 400 mg./ml. Thus, doses in the range 12.7 to 400 mg./kg. were administered to mice by the use of 0.01 ml. composition for each gram of body weight. For humans, the dosages is in the range 20 mg.–2 g. depending upon the activity of the active compound. In general where strong sedative activity in mice is referred to, these were put to sleep by the injection. Water used in making up the compositions was sterile and pyrogen free.

Example 1

Ethyl 3,6-dimethoxy phthalimidobutyrate was prepared as follows:

Ethyl 4-chlorobutyrate (1.7 g.) was added to a suspension of potassuim dimethoxyphthalimide (3.2 g.) in dimethylformamide (15 ml.). The mixture was boiled under reflux for 2 hours, filtered and concentrated to approximately 10 ml. under reduced pressure. The residual solution was poured into water (20 ml.) and the yellow precipitate collected. Recrystallization of the ester from aqueous methanol afforded yellow plates (1.7 g.) M.P. 90–91°. A sample recrystallized for analysis had M.P. 92–4°. Found: C, 59.7; H, 5.75; N, 4.45. $C_{16}H_{16}NO_6$ requires C, 59.8; H, 5.9; N, 4.4%.

A pharmaceutical composition containing the ester was made up with 50% aqueous propylene glycol. The composition showed moderate sedative activity and potentiation of the action of hexabarbitone in mice.

Example 2

Benzyl-4-(3,6-dimethoxyphthalimido)-butyrate was prepared as follows:

Thionyl chloride (12 ml.) was added to 3,6-dimethoxyphthalimidobutyric acid (2.5 g.) and boiled under reflux for 1 hour. The excess thionyl chloride was evaporated at reduced pressure and the residual acid chloride dissolved in dry chloroform (25 ml.). Benzyl alcohol (0.92 g.) was added followed by pyridine (0.70 g.) and the reaction mixture was allowed to stand at room temperature for 1 hour. The solution was washed with water (2× 10 ml.) and evaporated to dryness. Recrystallization of the solid residue from ethanol gave benzyl 3,6-dimethoxyphthalimidobutyrate as yellow needles (1.9 g., 62%) M.P. 102–103.5°. Found: C, 65.05; H, 5.3; N, 3.9. $C_{21}H_{21}NO_6$ requires C, 65.8; H, 5.5; N, 3.65%

A pharmaceutical composition containing the ester was made up with a 50% aqueous solution of propylene glycol. The composition showed sedative activity and potentiation of the action of hexabarbitone in mice.

Example 3

Iso-propyl 3,6-dimethoxyphthalimidobutyrate was prepared similarly to the benzyl ester (Example 2). It was obtained as golden yellow plates, M.P. 104–5°. Found: C, 59.9; H, 6.2; N, 4.1. $C_{17}H_{21}O_6N$ requires C, 60.9; H, 6.2; N, 4.2%.

A pharmaceutical composition containing the ester was made up with a 50% aqueous solution of propylene glycol. The composition showed moderate sedative activity and potentiation of the action of hexabarbitone in mice.

Example 4

Ethyl 4 - (4,4-diethylhomophthalimido) - butyrate was prepared as follows:

Ethyl iodide (3.1 g., 0.02 M) and a solution of sodium hydroxide (0.8 g., 0.02 M) in alcohol (15 ml.) were added to a mixture of ethyl 4-homophthalimidobutyrate (2.75 g., 0.01 M) in dry ethanol (20 ml.). The resulting solution was heated under reflux for 8 hours, the solvent was evaporated and the resulting green-brown oil was treated with water and extracted with chloroform. The latter extract was distilled to give ethyl 4-(4,4-diethylhomophthalimido)-butyrate as a light brown viscous oil (1.6 g. 52%) B.P. 154–5°/0.3 mm. $n_D^{22.5}$ 1.5259. Found: C, 68.46; H, 7.32; N, 4.38. $C_{19}H_{25}NO_4$ requires C, 68.86; H, 7.60; N, 4.23%.

A pharmaceutical composition containing the ester was made up with 50% aqueous propylene glycol. The composition showed moderate sedative activity in mice.

Example 5

Benzyl-4-phthalimidobutyrate was prepared as follows:

A mixture of 4-phthalimidobutyryl chloride, from the acid (2 g.), benzyl alcohol (1 g.), chloroform (20 ml.) and pyridine (1 ml.) was allowed to stand at room temperature for 1 hour, was washed with water (2× 20 ml.) and then evaporated on a steam bath under reduced pressure. The residual oil was distilled (B.P. 198°/1.32× $10^{-2}$ mm.) and the solid distillate (0.55 g. 20%) was crystallized from aqueous ethanol to give benzyl-4-phthalimidobutyrate as colourless prisms M.P. 57–8°. Found: C, 70.29; H, 5.33; N, 4.36. $C_{19}H_{17}NO_4$ requires C, 70.57; H, 5.30; N, 4.33%.

A pharmaceutical composition containing the ester was made up with 50% aqueous propylene glycol. The composition showed moderate sedative activity in mice.

Example 6

N,N - diethylphthalimidobutyramide was prepared as follows:

γ-Phthalimidobutyric acid (30 g.) in dry benzene (200 ml.) and thionyl chloride (60 ml.) was refluxed for 3 hours and concentrated to dryness. The solid residue was dissolved in dry benzene (150 ml.), cooled and a solution of diethylamine (19 g.) in benzene (50 ml.) added. The amine hydrochloride was filtered off, the filtrate concentrate to dryness and the residue crystallized from benzene-petroleum ether to give needles (81%) M.P. 80–2°. The amide was recrystallized from aqueous ethanol, M.P. 81–2°. Found: C, 67.1; H, 7.1; N, 9.6%. $C_{16}H_{20}N_2O_3$ requires C, 66.6; H, 7.0; N, 9.7%.

A pharmaceutical composition containing the amide was made up with polyethylene glycol 400. The composition showed strong sedative activity and potentiated the action of hexabarbitone in mice.

Example 7

N,N-diethyl tetrachlorophthalimidobutyramide was prepared as follows:

An intimate mixture of tetrachlorophthalmic anhydride (14.3 g.) and 4-aminobutyric acid (5.2 g.) was heated at 160–180° in an oil bath for 3 hours. The white solid turned to pale fawn with very little softening. The solid was extracted with glacial acetic acid (3× 200 ml.) and the 4-(tetrachlorophthalimido)-butyric acid crystallized on cooling as colourless plates (14.0 g., 76%) M.P. 267–71°. A sample recrystallized from ethylene glycol monoethyl ether had M.P. 273–5°. Found: C, 38.8; H, 1.8; N, 3.4; Cl, 35.8. $C_{12}H_7Cl_4NO_4$ requires C, 38.85; H, 1.9; N, 3.7; Cl, 38.2%.

The above acid (9.8 g.) was added to thionyl chloride (80 ml.) and heated under reflux for 1½ hours. The clear solution was concentrated to dryness at reduced pressure giving yellow needles (9.6 g.) M.P. 165–6°. A sample recrystallized from benzene-petroleum ether had M.P. 165–166.5°.

A solution of diethylamine (0.8 g.) in dry benzene (10 ml.) was added to a solution of tetrachlorophthalimidobutyryl chloride (prepared from 2.0 g. of the acid) in dry benzene (25 ml.). The mixture was heated on a steam bath for 10 mins., cooled and the benzene solution washed with water (20 ml. then 10 ml.). Evaporation of the solvent gave a pale fawn residue which on recrystallization from an aqueous methanol afforded the N,N-diethyl tetrachlorophthalimidobutyramide as cream platelets (1.6 g., 69%) M.P. 107°. Found: C, 44.45; H, 3.7; N, 6.3; Cl, 33.1. $C_{16}H_{16}Cl_4N_2O_3$ requires C, 45.1; H, 3.8; N, 6.6; Cl, 33.3%.

A pharmaceutical composition was made up by suspending the amide in arachis oil. The composition showed moderate sedative activity in mice.

Example 8

N,N-diethyl 4-(4 - aminophthalimido)-butyramide was prepared as follows:

A suspension of 10% palladium:charcoal (0.5 g.) in a solution of N,N-diethyl 4-(4-nitrophthalimido) - butyramide (3.3 g.) in ethyl acetate (60 ml.) absorbed 717 ml. of hydrogen at amospheric pressure during 5 hours. The mixture was filtered hot and the residue obtained on evaporation of the solvent was recrystallized from aqueous ethanol to give an almost quantitative yield of the N,N-diethyl 4-(4-aminophthalimido)-butyramide M.P. 139.5–141.5°. Found: C, 62.95; H, 7.19; N, 13.58. $C_{16}H_{21}N_3O_3$ requires C, 63.55; H, 6.98; N, 13.85%.

A pharmaceutical composition containing the amide was made up with 50% aqueous propylene glycol. The composition showed moderately strong sedative activity in mice.

Example 9

N,N - diethyl 4 - (3 - aminophthalimido) - butyramide was prepared as follows:

N,N - diethyl 4 - (3 - nitrophthalimido) - butyramide (3 g.) was reduced with hydrogen at atmospheric pressure as described above to give the N,N - diethyl 4 - (3 - aminophthalimido) - butyramide (75%) as pale green needles M.P. 96–8°. Found: C, 62.95; H, 6.78; N, 13.87. $C_{16}H_{21}N_3O_3$ requires C, 63.35; H, 6.98; N, 13.88%.

A pharmaceutical composition containing the amide was made up with 50% aqueous propylene glycol. The composition showed moderately strong sedative activity in mice.

Example 10

N,N - diethyl 4 - phenyl - 4 - phthalimidobutyramide was prepared as follows:

4 - phenyl - 4 - phthalimidobutyric acid (3.09 g.) was heated at reflux with thionyl chloride (10 ml.) for ¼ hour. The oil remaining when the excess of thionyl chloride had been removed was dissolved in dry benzene (20 ml.) to give a pale solution which was added slowly with stirring to an ice-cooled solution of diethylamine (5 ml.) in dry benzene (25 ml.). The resulting solution was extracted with diluted hydrochloric acid, then dilute potassium bicarbonate solution, dried (magnesium sulphate), and evaporated to give an oil which was crystallized from 80–100° petroleum ether (100 ml.) to give the N,N - diethyl 4 - phenyl - 4 - phthalimidobutyramide as white needles (2.6 g., 75% M.P. 101°. A specimen M.P. 102° was obtained by further crystallization. Found: C, 72.44, 72.47; H, 6.65, 6.70; N, 7.64. $C_{22}H_{24}N_2O_3$ requires C, 72.50; H, 6.64; N, 7.69%.

A pharmaceutcial composition containing the amide was made up with polyethylene glycol 400. The composition showed moderate sedative activity in mice.

Example 11

N,N - dimethyl 4 - phenyl - 4 - phthalimidobutyramide was prepared as follows:

This compound was prepared as described in Example 10 for the diethylamide from 4-phenyl-4-phthalimidobutyric acid (6.18 g.), thionyl chloride (10 ml.) and diethylamine (3.3 ml.) in 33% yield as needles M.P. 128–9° from a mixture of benzene (10 ml.) and cyclohexane (1 ml.). Found: C, 71.53; H, 5.82; N, 8.16. $C_{20}H_{20}N_2O_3$ requires C, 71.41; H, 5.99; N, 8.33%.

A pharmaceutical composition containing the amide was made up with polyethylene glycol 400. The composition showed moderately strong sedative activity in mice.

Example 12

N,N - dimethyl - 4 - phthalimidovaleramide was prepared as follows:

4 - aminovaleric acid was prepared from levulinic acid via 5 - methyl - 2 - pyrrolidone by reductive amination of levulinic acid (250 g.) with ice cold 0.880 ammonia followed by hydrogenation with Raney nickel (10–20 g.) at 100 atm./150° C. with hydrolysis of the obtained 5-methyl-2-pyrrolidone with barium hydroxide solution under reflux.

Alternatively 5 - methyl - 2 - pyrrolidone was prepared by: (a) heating methyl acylate (172 g.), nitroethane (430 ml.) and trimethylamine (140 ml.) at 30° for 4 days to give methyl 4-nitrovalerate B.P. 74–76°/0.5 mm., purified by distillation, and (b) hydrogenation of the methyl 4 - nitrovalerate at 3 atmospheres pressure in the presence of Raney nickel.

4-aminovaleric acid (71 g.) and phthalic anhydride (90 g.) were suspended in toluene (1 litre) and triethylamine (60 ml.) and refluxed for 5 hours with removal of water using a Dean and Stark head; 9.5 ml. water was collected. The solution obtained was evaporated to give an oil which was crystallized from 50% glacial acetic acid to give 4-phthalimidovaleric acid (87 g., 58.5%) M.P. 156–8°.

When desired, this acid was resolved by crystallizations from acetone with cinchonidine to give acid with $[\alpha]_D + 20.2°$ and this was converted to the dimethylamide, $[\alpha]_D + 15.8$, as described below.

4-phthalimidovaleric acid (150 g.) was refluxed for ½ hour on a steam bath with thionyl chloride (200 ml.). The solid remaining after the excess of thionyl chloride had been removed was crystallized from 80–100° petrol (2 l.) using dry charcoal. Yield 100 g. M.P. 68°. A pure sample of the acid chloride from 60–80° petrol melted 72.5–4.5°.

A solution of 4-phthalimidovaleryl chloride prepared as above (10.0 g.) in dry benzene (150 ml.) was added to a solution of dimethylamine (3.6 g., 2.1 equivalents) in dry benzene, with cooling to keep the temperature below 20°. The benzene solution was then washed (50 ml.) of 2 N hydrochloride acid, dried (magnesium sulphate) and evaporated to an oil which crystallized in fine needles from cyclohexane (200 ml.) to give the N,N-dimethyl - 4 - phthalimidovaleramide M.P. 86–7° (4.9 g., 47%). Found: C, 65.73; H, 6.67; N, 10.41. $C_{15}H_{18}N_2O_3$ requires C, 65.67; H, 6.1; N, 10.21%.

A pharmaceutical composition containing the amide was made up with a 25% aqueous solution of polyethylene glycol 400. The composition showed strong sedative activity and strong potentiation of the action of hexabarbitone in mice. It caused muscular incoordination and it also strongly antagonized pentylene tetrazole induced convulsions in mice. The L(+)— form was somewhat more active than the racemate.

Tablets for oral clinical administration were made up as follows: 400 mg. per tablet of N,N-dimethyl-4-phthalimidovaleramide (racemate) 200 mg. per tablet calcium hydrogen phosphate, 32 mg. per tablet of maize starch dried paste were sifted to 40 mesh and mixed with 320 mg. per tablet of 10% starch paste and then granulated to 12 mesh, dried at 50° C. and granulated to 16 mesh. 632 mg./tablet of these granules were then mixed with 2 mg./tablet of magnesium stearate and 14 mg./tablet of Amberlite XE88 and then granulated again to give granules A. Similarly, 400 mg./tablet of the amide, 200 mg./tablet of calcium hydrogen phosphate, 20 mg./tablet of Celacol M450, 18 mg./tablet of dried maize starch and 2 mg./tablet of magnesium stearate were mixed, sifted to 40 mesh, slugged twice to give ½" granules and further granulated to 16 mesh. 640 mg./tablet of these granules were then mixed with 1 mg./tablet of magnesium stearate and 7 mg./tablet of Amberlite XE88 and then granulated again to give granules B. Granules A and B were mixed together in approximately equal quantities and tabletted to give $\frac{7}{16}$" diameter biconvex tablets of maximum thickness 6.3 mm. (10 grains).

Clinical dosages of the above tablets varying from 200 mg. to 1.2 g. N,N-dimethyl-4-phthalimidovaleramide showed sedative activity and potentiated the action of hexabarbitone. A dosage of 200 mg. gave mild sedation over about 5 hours and a dosage of 400 mg. gave a hypnotic effect at night. In 120 patients no toxic side reactions were reported especially in respect of the blood or liver. The amide did not appear to dampen the arousal mechanism.

Example 13

N,N-diethyl-4-phthalimidovaleramide was prepared as follows:

This compound was prepared as described for the dimethylamide, for 4-phthalimidovaleryl chloride (15 g.) and diethylamine (25 ml.). The N,N-diethyl-4-phthalimidovaleramide was crystallized from water (3 l.) as white needles (a dihydrate) M.P. 60° (15.9 g., 87%). A pure specimen M.P. 65–6° was obtained after further crystallizations. Found: C, 60.38; H, 7.75; N, 8.09. $C_{17}H_{22}N_2O_3 \cdot 2H_2O$ requires C, 60.34; H, 7.74; N, 8.28%.

A pharmaceutical composition containing the amide was made up with polyethylene glycol 400. The composition showed moderate sedative activity and potentiation of the action of hexabarbitone in mice.

Example 14

N-(4-phthalimidovaleryl)-piperidine was prepared by reaction of phthalimidovaleryl chloride (8.0 g.) and piperidine (8.8 ml.). The N-(4-phthalimidovaleryl)piperidine was crystallized from 60% aqueous alcohol (150 ml.) in needles (8.5 g., 89%) M.P. 68–70. Found: C, 68.49; H, 7.09; N, 8.88. $C_{18}H_{22}N_2O_3$ requires C, 68.77; H, 7.05; N, 8.91%.

A pharmaceutical composition containing the amide was made up with polyethylene glycol 400. The composition showed moderately strong sedative activity in mice.

Example 15

Certain ring substituted phthalimidobutyramides were prepared as follows:

The appropriate phthalimidobutyric acid prepared by standard methods was converted to its acid chloride by refluxing with thionyl chloride for approximately 1 hour. The crude acid chloride obtained by evaporation was dissolved in dry chloroform, cooled and treated with two equivalents of an appropriate amine dissolved in dry chloroform. The mixture was allowed to stand at room temperature for 1 hour and any amine hydrochloride which separated removed by filtration. The chloroform solution was then washed with water, evaporated to dryness and the residual amide recrystallized.

Example 16

N,N-diethyl - 4 - (3 - acetylaminophthalimido)-butyramide was prepared as follows:

N,N-diethyl - 4 - (3 - nitrophthalimido) - butyramide (3 g.) (Example 28) was dissolved in acetic anhydride (25 ml.) and reduced with hydrogen at atmospheric pressure in the presence of 10% palladium-charcol. The product was recrystallized from aqueous ethanol as lemon yellow needles (2.5 g., 80%) M.P. 86–87.5°. Found: C, 62.25; H, 6.72; N, 11.90. $C_{18}H_{23}N_3O_4$ requires C, 62.59; H, 6.71; N, 12.17%.

A pharmaceutical composition containing the amide was made up with 50% aqueous propylene glycol. The composition showed moderate sedative activity in mice.

Example 17

N,N - dimethyl - 4 - phthalimidobutyramide was prepared in 78% yield by reaction between two equivalents of dimethylamine with 4-phthalimidobutyryl chloride and was recrystallized as colourless plates M.P. 86° C. from benzene-petroleum ether. Found: C, 64.59; H, 6.07; N, 10.59. $C_{14}H_{16}N_2O_3$ requires C, 64.60; H, 6.20; N, 10.76%.

A pharmaceutical composition containing the amide was made up by solution in sterile water. The composition showed strong sedative activity and moderate hexabarbitone potentiation in mice. It also showed moderate antagonism to pentylene tetrazole induced convulsions and reduction in muscle coordination in mice.

Example 18

N-4-phthalimidobutyrly-piperidine was prepared by reaction between piperidine and 4-phthalimidobutyryl chloride. The crude solid product was purified by distillation at 204°/0.2 mm. and the solid distillate was recrystallized from ethyl acetate-petroleum ether as cream micro crystals M.P. 59–60° C. Found: C, 68.06; H, 6.78; N, 9.33. $C_{12}H_{20}N_2O_3$ requires C, 67.98; H, 6.71; N, 9.33%.

A pharmaceutical composition containing the amide was made up in 50% aqueous propylene glycol. The composition showed strong sedative activity and moderate barbiturate potentiation in mice.

Example 19

N-4-phthalimidobutyryl-morpholine was prepared in 55% yield by the same procedure as the piperidide (Example 18) and was purified by distillation B.P. 255–60°/2.0 mm. The solid distillate was recrystallized for analysis from aqueous ethanol and dried at 70° for 4 hours, M.P. 99.5–100.5°. Found: C, 63.31; H, 5.98; N, 9.05.

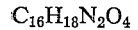

requires C, 63.56; H, 6.00; N, 9.27.

A pharmaceutical composition containing the amide was made up in polyethylene glycol 400. The composition showed moderate strong sedative activity and some potentiation of the action of hexabarbitone in mice.

Example 20

N,N-diallyl - 4 - phthalimidobutyramide was prepared by reaction between di-N-allylamine and 4-phthalimidobutyryl chloride. The crude product was distilled to yield a clear orange viscous oil B.P. 204/0.4 mm. $n_D^{25}$ 1.5570. Found: C, 68.71; H, 6.40; N, 9.01. $C_{18}H_{20}N_2O_3$ requires C, 69.21; H, 6.45; N, 8.97%.

A pharmaceutical composition containing the amide was made up in 50% aqueous propylene glycol. The composition showed strong sedative activity, strong potentiation of the action of hexabarbitone, moderate antagonism to pentylene tetrazole induced convulsions and moderate reduction of muscle coordination in mice.

Example 21

N,N-diethyl 4-(3,6-dimethylphthalimido) - butyramide was prepared from 4-(3,6-dimethylphthalimido)-butyryl chloride and diethylamine in 83% yield on recrystallization from aqueous methanol as colourless microprisms M.P. 98°. Found: C, 68.06; H, 7.40; N, 8.43. $C_{18}H_{24}N_2O_3$ requires C, 68.33; H, 7.65; N, 8.85%.

A pharmaceutical composition containing the amide was made up in 50% aqueous propylene glycol. The composition showed moderate sedative activity in mice.

Example 22

N-4-(3,6-dimethylphthalimidobutyryl)-piperidine was prepared from 4-(3,6-dimethylphthalimido)-butyryl chloride by reaction with piperidine in 85% yield and was obtained as colourless microprisms from aqueous alcohol M.P. 100.5°. Found: C, 68.71; H, 7.22; N, 8.98.

$C_{19}H_{24}N_2O_3$ requires C, 69.49; H, 7.37; N, 8.53%.

A pharmaceutical composition containing the amide was made up by suspension in 1% aqueous carboxymethyl cellulose solution. The composition showed sedative activity in mice.

Example 23

N,N-dimethyl-4-quinolinimidobutyramide was prepared as follows:

Dimethylamine (4 g.) was added to a solution of 4-quinolinimidobutyryl chloride, from the acid (3 g.) in chloroform (20 ml.) and the mixture was allowed to stand at room temperature overnight. The solution was then washed with 10% aqueous sodium carbonate (20 ml.), water (20 ml.), dried (MgSO₄) and then distilled to yield the crude amide as a dark brown viscous oil (2 g., 60%) B.P. 200°/0.25 mm.–192°/.01 mm. The latter solidified on standing and was recrystallized from ethyl acetate: petroleum with charcoal to yield the pure N,N-dimethyl-4-quinolinimidobutyramide as white prisms M.P. 124–5°. Found: C, 59.44; H, 5.87; N, 15.51. $C_{13}H_{15}N_3O_3$ requires C, 59.76; H, 5.79; N, 16.08%.

A pharmaceutical composition containing the amide was made up with 50% aqueous propylene glycol. The composition showed moderate sedative activity in mice.

Example 24

N,N-dimethyl cis Δ⁴-tetrahydrophthalimidobutyramide was prepared as follows:

An intimate mixture of cis Δ⁴-tetrahydrophthalic anhydride (15 g.) and 4-aminobutyric acid (10.6 g.) was heated at 160° for 1 hour and the cooled solid residue was recrystallized from ethanol to give the cis Δ⁴-tetrahydrophthalimidobutyric acid as fine white needles (16 g., 68%) M.P. 99–102°. A sample recrystallized for analysis had M.P. 108.5–110°. Found: C, 60.18; H, 6.10; N, 5.91. $C_{12}H_{15}NO_4$ requires C, 60.75; H, 6.37; N, 5.90%.

The dimethylamide was prepared in the normal way via the acid chloride and was obtained on distillation as a viscous amber oil B.P. 178–190°/0.3 mm. On distillation for analysis N,N-dimethyl cis Δ⁴-tetrahydrophthalimidobutyramide had B.P. 192°/0.4 mm. $n_D^{25}$ 1.5237. Found: C, 63.51; H, 7.55; N, 10.59. $C_{14}H_{20}N_2O_3$ requires C, 63.61; H, 7.63; N, 10.60%.

A pharmaceutical composition containing the amide was made up with 50% aqueous propylene glycol. The composition showed moderate sedative activity in mice.

Example 25

N,N-diethyl cis Δ⁴ - tetrahydrophthalimidobutyramide was prepared as in Example 24 and was obtained as a brown viscous oil B.P. 170–190°/3.03–.05 mm. $n_D^{22.5}$ 1.5214. Found: C, 62.89; H, 7.67; N, 9.09. $C_{16}H_{24}N_2O_4$ requires C, 64.00; H, 8.09; N, 9.21%.

A pharmaceutical composition containing the amide was made up with 50% aqeuous propylene glycol. The composition showed moderate sedative activity in mice.

Example 26

N-(4-phenyl-4-phthalimidobutyryl) - morpholine was prepared in the usual way from 4-phenyl-4-phthalimidobutyric acid (2.9 g.), thionyl chloride (6 ml.) and morpholine (2.7 ml.). Crystallization of the crude product from a 1:1 mixture of benzene and cyclohexane (40 ml.) gave N-(4-phenyl-4-phthalimidobutyryl)-morpholine as needles M.P. 150–1° (1.9 g., 54%). A pure specimen M.P. 151–2° was obtained after recrystallization. Found: C, 69.78; H. 6.14; N, 7.52. $C_{22}H_{22}N_2O_4$ requires C, 69.82; H, 5.86; N, 7.40%.

A pharmaceutical composition containing the amide was made up with polyethylene glycol. The composition showed moderate sedative activity in mice.

Example 27

Dimethyl 5-phthalimidovaleramide was prepared as follows:

The acid chloride of 5-phthalimidovaleric acid (10 g.) was prepared in the usual way using thionyl chloride (20 ml.). The solution of the crude acid chloride in dry benzene (100 ml.) was then added to a solution of dimethylamine (25 ml.) in dry benzene (200 ml.); the mixture was kept below 30° during the addition. The resulting solution was then washed with water (100 ml.), 2 N hydrochloric acid (50 ml.) and N potassium bicarbonate solution (50 ml.) and then dried with magnesium sulphate and finally evaporated to an oil (10 g.) which would not crystallize. This gave after distillation $$(270–290°/8–9 \times 10^{-3} \text{ mm.})$$

a colourless oil (6.5 g., 59%) which gave crystals M.P. 62–3° on standing. Dimethyl 5-phthalimidovaleramide was obtained as needles M.P. 72–2.5° from a mixture of benzene and cyclohexane. Found: C, 65.13; H, 6.96; N, 10.11. $C_{15}H_{18}N_2O_3$ requires C, 65.67; H, 6.61; N, 10.21%.

A pharmaceutical composition containing the amide was made up with polyethylene glycol. The composition showed moderately strong sedative activity and moderate potentation of hexabarbitone in mice.

Example 28

N-5-phthalimidovalerylmorpholine was prepared as in Example 27 from 5-phthalimidovaleric acid (6.25 g.) and morpholine (6.1 g.). On evaporation of the benzene solution a solid was obtained which gave N-5-phthalimidovalerylmorpholine M.P. 88–90 (3.6 g., 45%) after recrystallization from a mixture of benzene and cyclohexane. Found: C, 64.65; H, 6.89; N, 8.83. $C_{17}H_{20}N_2O_4$ requires C, 64.54; H, 6.37; N, 8.86%.

A pharmaceutical composition containing the amide was made up with polyethylene glycol. The composition showed moderate sedative activity in mice.

Example 29

4-(o-Benzoylsulfimido)-valeric acid dimethylamide was prepared as follows:

N,N-dimethyl-4-chlorovaleramide (78.3 g., Example 73) and dry sodium saccharin (116 g.) were heated in dimethylformamide under reflux for 15 hours. The mixture was cooled and chloroform (500 ml.) and water (600 ml.) were added. The chloroform layer was separated and the aqueous layer further extracted with chloroform (2×200 ml.). The combined chloroform extracts were washed first with 2 N caustic soda (2×250 ml.), then 2 N hydrochloric acid (200 ml.) and finally with brine (200 ml.). The dark coloured solution was filtered through sodium sulphate, boiled with charcoal (10 g.), dried over sodium sulphate and evaporated from a steam bath at reduced pressure to remove the dimethylformamide to give a dark crystalline solid (49.6 g.). Purification was effected by filtration in ethyl acetate over Florisil, which removed most of the colour of impurity, and then several crystallizations from ethyl acetate to give 4-(o-benzoylsulfimido)-valeric acid dimethylamide as colourless crystals (31.9 g.) M.P. 106.5–7°. Found: C, 54.24; H, 5.74; N, 8.98. $C_{14}H_{18}N_2O_4S$ requires C, 54.19; H, 5.84; N, 9.03%.

A pharmaceutical composition containing this amide was made by suspending it in 1% aqueous carboxymethyl cellulose solution containing 0.5% of "Tween" 80. The composition showed in mice strong sedative activity, strongly potentiated the action of hexabarbitone, caused moderate muscular incoordination and moderate antagonism to pentylene tetrazole induced convulsions.

Example 30

N,N-dimethyl-4-phthalimidopent-2-eneamide was prepared as follows:

4-phthalimidopent-2-enoic acid (8 g.) (J. Chem. Soc., 1955, 1631) suspended in dry methylene chloride (80 ml.) containing dimethylformamide (2 drops) was treated with thionyl chloride (7 ml.) and heated at reflux 45 minutes. The solvent was then evaporated from a bath at 35° C. under reduced pressure. Further dry methylene chloride (80 ml.) was added and the solution evaporated as above to give a dark brown oil. This was dissolved in dry benzene (100 ml.) and treated with a solution of dimethylamine in ether until just alkaline. The solution was filtered, evaporated, dissolved in benzene (100 ml.) and again evaporated to give an orange oil which was filtered in benzene (100 ml.) over alumina (120 gm. acidic Brockmann-1).

After evaporation, a pale brown oil (5.1 g.) was obtained which was distilled at 160–200/0.4 mm. to give a pale oil (4.5 g.). The amide was eventually obtained as crystals 2.45 g., 28% M.P. 79.5–80° after the oil had been dissolved in about 100 ml. diethyl ether and this solution allowed to evaporate slowly. Found: C, 66.08; H, 6.15; N, 10.00. $C_{15}H_{16}N_2O_3$ requires C, 66.16; H, 5.92; N, 10.29%.

A pharmaceutical composition containing this amide was made by suspending it in 1% aqueous carboxymethyl cellulose solution containing 0.5% of "Tween" 80. The composition showed in mice strong sedative activity and strong hexabarbitone potentiation, strongly antagonized pentylene tetrazole induced convulsions and strongly caused muscular incoordination.

Example 31

N,N-dimethyl 4-phthalimidohexanamide was prepared as follows:

Methyl 4-nitrohexanoate (140 g.) in ethanol (200 ml.) was hydrogenated at 60° and 80 atmospheres for 24 hours with Raney Nickel (about 15 g.). The reaction mixture was allowed to cool, the catalyst was filtered off and evaporated from a steam bath at water-pump pressure to an oil, which, upon distillation, gave as major fraction 5-ethyl-2-pyrrolidone 47.8 g., B.P. 160–200°/60–100 mm. $\mu_D^{22}$ 1.4707.

Barium hydroxide octahydrate (9.24 g.) was added to 5-ethyl-2-pyrrolidone (6.05 g.) in water (50 ml.) and the mixture heated at reflux 1 hour. Further water (50 ml.) was added and carbon dioxide was passed through the solution until it was neutral. The white precipitate formed was filtered off and the remaining solution was taken to dryness to give 4-aminohexanoic acid 4.0 g.

A mixture of 4-aminohexanoic acid (10.95 g.) and phthalic anhydride (12.4 g.) was ground finely, added to dimethyl formamide (30 ml.) and the mixture heated at reflux for 5 hours. The solution was cooled, filtered and poured into water (300 ml.) when an oil separated. This eventually crystallized after being cooled in ice water and scratched with a glass rod to give the 4-phthalimidohexanoic acid, 9.3 g. M.P. 101–2°, recrystallized from 50% aqueous acetic acid M.P. 104–5°. Found: C, 64.50; H, 5.78; N, 5.34. $C_{14}H_{15}NO_4$ requires C, 64.36; H, 5.79; N, 5.36%.

4-phthalimidohexanoic acid (5.0 g.) was dissolved in dry methylene chloride (100 ml.); thionyl chloride (3 ml.) was added and the solution was heated at reflux for 1¼ hours. The solvent was evaporated at below 40° to give an oil, which was treated with dry methylene chloride (100 ml.) and again evaporated at room temperature to give a yellow solid. This was dissolved in dry benzene and treated with a solution of dimethylamide in dry ether until just alkaline. It was evaporated as above, dissolved in ethyl acetate (100 ml.) and the solution washed with 2 N hydrochloric acid (50 ml.), water (50 ml.), dried (sodium sulphate) and evaporated to a pale brown oil (5.0 g.), which was distilled from a bath at 220–240° at 7×10⁻² mm. to give N,N-dimethyl 4-phthalimidohexanamide as a colourless oil. Found: C, 66.30; H, 6.96; N, 9.53. $C_{16}H_{20}N_2O_3$ requires C, 66.64; H, 6.99; N, 9.72%.

A pharmaceutical composition containing the amide was made up by suspending it in 1% aqueous carboxymethyl cellulose solution containing 0.5% of "Tween" 80. The composition showed in mice strong sedative activity and strong hexabarbitone potentiation, strongly antagonised pentylene tetrazole induced convulsions and strongly caused muscular incoordination.

Example 32

4-(o-Benzoylsulfimido)-butyric acid dimethylamide was prepared as follows:

γ-Chlorobutyronitrile (10.4 g.) and anhydrous saccharin (20.5 g.) were mixed and heated at 150–180° for 2½ hours. The semi-solid cream mixture was washed by decantation with boiling water (2×100 ml.) and the residue recrystallized from aqueous alcohol as white needles (18 g., 72%) M.P. 98–100°. A sample recrystallized from alcohol for analysis had M.P. 104°. Found: C, 53.0%; H, 4.08%; N, 11.0, 11.2%. $C_{11}H_{10}N_2O_3S$ requires C, 52.8%; H, 4.03%; N, 11.2%.

The Nitrile (5 g.) was added to sulphuric acid (10 ml., s.g. 1.84) and heated on a steam bath for 10 mins. The clear solution was poured on to ice and allowed to stand for 1 hour. The white crystalline solid 4-(o-benzoylsulfimido)-butyramide was collected and recrystallized from water (100 ml.) (3.2 g., 60%) M.P. 148–149.5. A sample further recrystallized for analysis had M.P. 151–3°. Found: C, 49.52%; H, 4.93%; N, 10.3%. $C_{11}H_{12}O_4N_2S$ requires C, 49.25%; H, 4.51%; N, 10.45%.

4-(o-Benzoylsulfimido)-butyramide (1 g.) in acetone (20 ml.), water (20 ml.) and concentrated hydrochloric acid (5 ml.) was heated at reflux for 2 hours. The solution was evaporated to dryness and the oil formed crystallized on standing to give the 4-(o-benzoylsulfimido)-butyric acid (0.65 g.) M.P. 100–5°. After several crystallizations from 50% acetic acid the melting point was 106–8°. Found: C, 49.30; H, 4.05; N, 5.47. $C_{11}H_{11}NO_5S$ requires C, 40.05; H, 4.12; N, 5.20%.

4-(o-benzoylsulfimido)-butyric acid (3 g.) was heated in dry methylene chloride (60 ml.) containing thionyl chloride (2 ml.) and dimethylformamide (2 drops) at reflux for ¾ hour. The solution was evaporated and further methylene chloride (60 ml.) was added and this solution was evaporated to a yellow oil, which in benzene (80 ml.) solution was treated with a solution of dimethylamine in ether (with cooling below 20°) until just alkaline. The solution was filtered, evaporated, the oil dissolved benzene (60 ml.) and the solution again evaporated to an oil, which was induced to crystallize by scratching under cyclohexane. The crystals were washed with ether (15 ml.) and then recrystallized from 20% benzene in cyclohexane (16 ml.) to give the 4-(o-benzoylsulfimido)-butyric acid dimethylamide (2.6 g., 71%) M.P. 81–2°. Further crystallization raised the melting point to 84–5°. Found: C, 53.16; H, 5.52; N, 9.09. $C_{13}H_{11}N_2O_4S$ requires C, 52.70; H, 5.41; N, 9.46%.

A pharmaceutical composition containing this amide was made up with 1% aqueous "Tween" 80. The composition showed sedative activity, moderate potentation of hexabarbitone, moderately caused muscular incoordination and moderately antagonised pentylene tetrazole induced convulsions.

Example 33

1,3 - dioxo-2 - (3' - dimethylaminoprop - 1'-yl) - 4,9-methano - 3a,4,9,9a - tetrahydrobenz[f]isoindole was prepared as follows:

1-4, - methano-1,2,3,4-tetrahydronaphthalene - 2,3-dicarboxylic anhydride (4.3 g.) was added in small portions over 1 hour to a stirred solution of aqueous ammonia (density, 0.88), with gentle heating after each addition to give a clear solution. This solution of the ammonium salt was evaporated to dryness and the buff coloured solid was heated for 1 hour at 190–200°. The solid remaining was taken up in absolute ethanod (50 ml.); the filtered solution gave on cooling colourless crystals of 1,4-methanol - 1,2,3,4 - tetrahydronaphthalene-2,3-dicarboximide (2 g.) M.P. 242–4°. Found: C, 73.37; H, 5.17; N, 6.74. $C_{13}H_{11}NO_2$ requires C, 7322; H, 5.20; N, 6.57%.

The potassium salt was prepared by treating a solution of the foregoing dicarboximide (2.13 g.) in acetone (55 ml.) at 50° with alcoholic potassium hydroxide solution (11.8 ml., 0.845 N). A white precipitate was produced immediately; when the solution had been cooled the salt was filtered off, washed with acetone and dried (1.55 g., 62%).

4-chlorobutyryl chloride (100 g.) in dry ether (250 ml.) was treated with dimethylamine in ether until just alkaline, with cooling to below 20° C. Water (100 ml.) was added, and the ether layer separated, washed with 2 N hydrochloric acid (100 ml.), 2 N bicarbonate solution (50 ml.) and finally water (50 ml.), dried, evaporated and distilled at about 110/15 mm. to give crude N,N-dimethyl 4-chlorobutyramide 59.6 g. $\mu_D^{20}$ 1.4723. The crude material was used in the next stage.

Potassium 1,4 - methano-1,2,3,4 - tetrahydronaphthalene-2,3-dicarboximide (7.53 g.) and crude dimethyl 4-chlorobutyramide (6 g.) were heated (in dimethylformamide (100 ml.)) at reflux for 3½ hours. The solution was cooled, filtered and evaporated to a brown gum which was recrystallized several times from ethyl acetate; the white crystals of 1,3-dioxo-2-(3'-dimethylaminocarbonylprop - 1'-yl)-4,9-methano - 3a,4,9,9a - tetrahydrobenz[f]isoindole (4 g.) were dried thoroughly in high vacuum to constant M.P. 118–9°. Found: C, 70.08; H, 6.68; N, 8.18. $C_{19}H_{22}N_2O_3$ requires C, 69.92; H, 6.79; N, 8.58%.

A pharmaceutical composition containing this amide was made up with 1% aqueous "Tween" 80. The composition showed moderate sedative activity, moderately potentiated hexabarbitone and strongly caused muscular incoordination and it antagonised pentylene tetrazole induced convulsions in mice.

Example 34

1,3 - dioxo-2 - (1' - dimethylaminocarbonylbut-3'-yl)-4,9 - methano - 3a,4,9,9a-tetrahydrobenz[f]isoindole was prepared as follows:

4-aminovaleric acid (1.17 g.) and 1,4-methano-1,2,3,4-tetrahydronaphthalene-2,3-dicarboxylic anhydride (2.14 g.) were heated in dimethylformamide (50 ml.) at reflux for 3 hours. The solution was poured into water (100 ml.) and extracted with ether (3 × 50 ml.). Ether (100 ml.) and 2 N potassium bicarbonate was added to the solid, and when all solid had dissolved, the aqueous layer was separated and acidified with concentrated hydrochloric acid. The oil which separated crystallized overnight and was filtered off, washed with water, and dried on a steam bath to give 1,3-dioxo-2(1'-carboxybut-3'-yl)-4,9 - methano - 3a,4,9,9a - tetrahydrobenz[f]isoindole (1.11 g.) M.P. 142.5–3°. This was recrystallized from ethyl acetate M.P. 143–4°.

The foregoing acid (2.84 g.) was converted by the mixed anhydride method with triethylamine (1.83 ml.) dry tetrahydrofuran (40 ml.), isobutylchloroformate (1.71 ml.) and dimethylamine (1.1 ml.) to 1,3-dioxo-2-(1' - dimethylaminocarboxylbut-3'-yl) - 4,9 - methano-3a,4,9,9a - tetrahydrobenz[f]isoindole (1.72 g.), M.P. 151.5–152° (from ethyl acetate). Further crystallization gave a sample, M.P. 153–3.5°. Found: C, 70.56; H, 7.11; N, 8.23. $C_{20}H_{24}N_2O_3$ requires C, 70.06; H, 6.82; N, 8.39%.

A pharmaceutical composition containing this amide was made up with 1% aqueous "Tween" 80. The composition showed moderate sedative activity and moderately potentiated the action of hexabarbitone in mice.

Example 35

N,N - dimethyl 4 - phthalimidinovaleramide was prepared as follows:

Zinc wool (53 g.) was amalgamated with a solution of mercuric chloride (4.5 g.) in water (110 ml.) and concentrated hydrochloric acid (8 ml.), shaking for 5 minutes. The liquid was decanted from the zinc and replaced with water (110 ml.) 4-phthalimidoveleric acid (23.2 g.) was added, then concentrated hydrochloric acid (52 ml.) and the mixture was heated on a steam bath for 3 hours. The liquid was decanted and kept overnight at 4°, but as no crystals had separated the oil was extracted with chloroform. The solution was dried (sodium sulphate) and evaporated to a yellow oil (7.25 g.) which crystallized on standing.

After several crystallizations from methanol (ca. 20 ml.), the 4-phthalimidinovaleric acid had M.P. 109–9.5°. Found: C, 67.22; H, 6.53; N, 6.01. $C_{13}H_{15}NO_3$ requires C, 66.93; H, 6.48; N, 6.01%.

4-phthalimidinovaleric acid (3.24 g.) was converted by the mixed anhydride method using triethylamine (1.92 ml.) isobutylchloroformate (1.8 ml.) and dimethylamine (1.1 ml.) to an oil 3.09 g. which crystallized on long standing. The crude crystals were washed with a little ether, dissolved by boiling in ether (100 ml.) and colourless crystalline N,N-dimethyl 4-phthalimidinovaleramide (0.76 g.), M.P. 81.5–2.5° was obtained after the solution had been evaporated to 40 ml. Found: C, 69.24; H, 7.94; N, 10.72. $C_{15}H_{20}N_2O_2$ requires C, 69.20; H, 7.74; N, 10.76%.

A pharmaceutical composition containing the amide was made up with 1% aqueous "Tween" 80. The composition showed moderate sedative activity in mice.

Example 36

N-tert-butyl 4-phthalimidovaleramide was prepared by the mixed anhydride technique from 4-phthalimidovaleric acid (4.94 g.), triethylamine (2.76 ml.), isobutyl chloroformate (2.72 ml.) and tert-butyl-amine (2.62 ml.). The crude product (3.2 g.) was recrystallized from ether (50 ml.) to give the desired amide (2.2 g.), M.P. 106–8°. Found: C, 66.71; H, 7.11; N, 9.03. $C_{17}H_{22}N_2O_3$ requires C, 67.52; H, 7.33; N, 9.27%.

A pharmaceutical composition containing the amide was made up with 1% aqueous "Tween" 80. The composition showed strong sedative activity in mice.

Example 37

N,N - 3 - trimethyl-4-phthalimidobutyramide was prepared as follows:

Ethyl 3-methyl-4-nitrobutyrate (35 g.) in ethanol (200 ml.) was hydrogenated for 24 hours at 80° and 80 atmospheres in presence of Raney Nickel (ca. 30 g.). The solution was filtered, evaporated and then distilled, 4-methyl-2-pyrrolidone, a colourless oil (6.4 g.) being collected at 89–92°/1 mm. It crystallized on standing to a white solid M.P. 42.4°.

4-methyl-2-pyrrolidone (6.4 g.) was heated in 50% concentrated hydrochloric acid (40 ml.) at reflux for 18 hours. The solution was evaporated to a colourless oil which in solution in distilled water (50 ml.) was run slowly through a column of Amberlite IR45 (hydroxyl form, wet volume 150 ml.). The column was washed with water 250 ml., and the combined eluents were evaporated to give crude 4-amino-3-methyl-butyric acid (4.23 g.) as a white solid.

The amino acid (4.23 g.) and phthalic anhydride (5.35 g.) were heated in dimethylformamide (15 ml.) at reflux for 3 hours. The solution was poured into water and gave an oil which on standing crystallized (6.93 g.) M.P. 129–31°. Recrystallization from ethanol gave 3-methyl 4-phthalimidobutyric acid M.P. 141–2°. Found: C, 62.81; H, 5.35; N, 6.23; $C_{13}H_{13}NO_4$ requires C, 63.15; H, 5.30; N, 5.67%.

N,N-3-trimethyl-4-phthalimidobutyramide was prepared by the mixed anhydride method from the acid (4.94 g.), triethylamine (2.02 ml.), iso-butylchloroformate (2.58 ml.) and dimethylamine (2 ml.). After several recrystallizations from diisopropyl ether the amide (0.7 g.) M.P. 82–3° was obtained. Found: C, 65.13; H, 6.59; N, 10.51. $C_{15}H_{18}N_2O_3$ requires C, 65.67; H, 6.61; N, 10.21%.

A pharmaceuctical composition containing the amide was made up with 1% aqueous "Tween" 80. The composition showed strong sedative activity in mice.

Example 38

N,N-diethyl 4-methyl 4-phthalimidovaleramide was prepared as follows:

4-methyl 4-nitrovaleric acid (80.5 g.), prepared as described in Example 39, was converted via the acid chloride and reaction thereof with diethylamine (125 ml.) to the diethylamide, obtained as a pale yellow oil (91.35 g.) B.P. 127°/0.5–134°/0.6 mm. On distillation an almost colourless oil B.P. 144–150°/2 mm., $\mu_D^{19}$ 1.4681 was obtained. Found: C, 55.79; H, 9.14; N, 12.97. $C_{10}H_{23}N_2O_3$ requires C, 55.53; H, 9.32; N, 12.95%.

Diethyl 4-methyl 4-nitrovaleramide (17.57 g.) in ethanol (150 ml.) was hydrogenated at room temperature and atmospheric pressure in the presence of palladium on charcoal (10 g., 10%). Hydrogen uptake was rapid after an initial induction period of about 10 minutes and stopped after about 2 hours. The solution was filtered and evaporated from a bath at 35° to give an oil (15.4 g.). On distillation the amide was obtained as a very pale blue mobile liquid B.P. 100–2/0.8 mm., $\mu_D^{19}$ 1.4672. Found: C, 64.50; H, 11.42; N, 14.64. $C_{10}H_{22}N_2O$ requires C, 64.47; H, 11.90; N, 15.04%.

To an ice-cooled and magnetically stirred solution of redistilled phthaloyl chloride (3.27 g.) in dry tetrahydrofuran (50 ml.) was added dropwise over ½ hour a solution of triethylamine (3.24 g.) and N,N-diethyl-4-amino-4-methylvaleramide (3.26 g.) in dry tetrahydrofuran (25 ml.). A white precipitate appeared during the addition. The suspension was stirred with ice cooling for 1 hour, then evaporated from a steam bath at reduced pressure. The residue was treated with 2 N hydrochloric acid (25 ml.) and chloroform (50 ml.). The chloroform layer was separated, washed with brine and evaporated to a pale yellow oil (5.6 g.), whose infra-red spectrum was consistent with the corresponding phthalamic acid.

It was heated in an oil-bath at 170–180° for 2 hours, dissolved in chloroform and washed thoroughly with 2 N potassium bicarbonate solution. The chloroform solution was dried (magnesium sulphate) and evaporated to an oil (1.8 g.) which was distilled in a bath-tube at $1.5 \times 10^{-2}$ mm. with bath temperature 180–90° to give N,N-diethyl-4-methyl-4-phthalimidovaleramide as a pale yellow oil (1.33 g.) having an infra-red spectrum consistent with required structure.

A pharmaceutical composition containing the amide was made up with 1% aqueous "Tween" 80. The composition showed strong sedative activity in mice.

Example 39

N,N - dimethyl - 4-methyl-4-phthalimidovaleramide was prepared as follows:

Methyl-4-methyl-4-nitrovalerate, prepared by condensation of 2-nitropropane and methylacrylate (Org. Syntheses, 32, 86) (280 g.) was refluxed for 1 hour with potassium hydroxide solution (116 g. in 580 ml. water). The acid was purified by charcoal treatment, acidification and ether extraction to give an oil which gave yellow crystalline solid acid on cooling (246 g.).

The acid (64 g.) was dissolved in thionyl chloride (64 ml.) and heated at 100° C. for ½ hour. Excess of thionyl chloride was removed and the acid chloride was dissolved in dry benzene (100 ml.) and then carefully added to an excess of dimethylamine in dry benzene (500 ml.) with stirring and cooling to below 25°. The benzene solution was washed with water, 2 N hydrochloric acid, 2 N caustic soda solution, dried and evaporated to leave dimethyl-4-methyl-4-nitrovaleramide as in oil B.P. 120°/125 mm.–140°/2.5 mm. (43.5 g.) $\mu_D^{24}=1.465$. After distillation the material had B.P. 108°/0.5 mm–114°/0.6 mm., $\mu_D^{22}=1.4708$. Found: C, 51.03; H, 8.28; N, 14.91. $C_8H_{16}N_2O_3$ requires C, 51.05; H, 8.57; N, 14.88%.

Dimethyl-4-methyl-4-nitrovaleramide was hydrogenated as for the diethylamide (Example 38) at room temperature and atmospheric pressure in the presence of palladium on charcoal. Hydrogen was taken up for about 2 hours. The solution was filtered and evaporated to give dimethyl-4-methyl-4-aminovaleramide as a colourless oil.

N,N - dimethyl-4-methyl-4-phthalimidovaleramide was prepared essentially as described in Example 38 from phthaloylchloride (9.5 g.), N,N-dimethyl-4-amino-4-methyl-valeramide, triethylamine (9.9 g.). The crude phthalamic acid (4.53 g.) was distilled in a bulb tube, the fraction collected at 150–220 (bath temperature) and $10^{-3}$ mm., a yellow oil containing a few crystals, was dissolved in ether and the resulting solution filtered, washed with 2 N potassium bicarbonate solution, dried and then evaporated to an oil which was distilled to give the amide as a pale yellow oil (0.43 g.) boiling at 160–190° at $10^{-3}$ mm. The infra-red spectrum was consistent with required structure.

A pharmacetutical composition containing this amide was made up with 1% aqueous "Tween" 80. The composition showed strong sedative activity, potentiated the action of hexabarbitone, caused muscular incoordination and antagonised pentylene tetrazole induced convulsions in mice.

Example 40

4-(o-benzoylsulfimido)-but-2-enoic acid dimethylamide was prepared as follows:

Sodium saccharin (6.83 g.; 0.033 mole) and 4-bromocrotonic acid (5.50 g.; 0.033 mole) in dimethylformamide (75 c.) were heated on a steam bath for 24 hours. The reaction mixture was poured into water and isolated with chloroform gave a brown solid (8.17 g.) which afforded 4(o-benzoylsulfimado)-but-2-enoic acid (5.24 g.; 0.0196 mole) M.P. 191–193° on crystallization from methanol. Two crystallizations from ethanol raised the melting point to 198–199°.

4 - (o-benzoylsulfimido)-but-2-enoic acid (2.26 g., 0.0085 mole) in methylene chloride (50 cc.) containing one drop of dimethylformamide was heated under reflux with thionyl chloride (1.21 cc.; 0.017 mole). The solvent was removed in vacuo and the residue taken up in methylene chloride (50 cc.), cooled in ice and stirred while a benzene solution of dimethylamine was added until the reaction mixture became alkaline. After water had been added and the organic layer separated, the aqueous fraction was extracted with chloroform and the combined extracts washed with bicarbonate solution and water then dried and evaporated to give an orange solid (2.59 g.). On crystallization from methanol 4-(o-benzoylsulfimido)-but-2-enoic acid dimethylamide (2.01 g.; 0.0068 mole) M.P. 163–164° was obtained. Analytical sample had M.P. 164–165°, from methanol. Found: C, 52.93; H, 4.95; N, 9.48; S, 10.70%. $C_{13}H_{14}N_2O_4S$ requires C, 53.05; H, 4.80; N, 9.52; S, 10.89%.

A pharmaceutical composition containing this amide was made up with 1% aqueous "Tween" 80. The composition showed sedative activity, moderate potentiation of hexabarbitone, caused muscular incoordination and showed pentamethylene tetrazole antagonism in mice.

Example 41

4-(o-benzoylsulfimido)-pent-2-enoic acid dimethylamide was prepared as follows:

Pent-2-enoic acid (20.02 g.; 0.20 mole), N-bromosuccinimide (35.60 g.; 0.20 mole) and benzoyl peroxide (100 mg.) were heated under reflux in carbon tetrachloride (200 cc.) for 4 hours. After cooling and filtering, the solvent was removed to give an oil which gave 4-bromopent-2-enoic acid (32.67 g.; 0.183 mole) M.P. 69–72° on crystallization from light petroleum (B.P. 60–80°). Crystallization from ethyl acetate/petroleum (B.P. 60–80°) raised the melting point to 78–80°.

Sodium saccharin (20.50 g.; 0.10 mole) and 4-bromopent-2-enoic acid (20.73 g.; 0.10 mole) were heated on a steam bath for 48 hours in dimethylformamide (300 cc.). After cooling, the mixture was poured into water and extracted with chloroform. The brown oil obtained was crystallized from benzene to give 4-(o-benzoylsulfimido)-pent-2-enoic acid (9.27 g.; 0.033 mole) M.P. 159–60°. Crystallization from methanol gave a melting point of 162–164°.

The acid (2.0 g.; 0.0071 mole) was treated as in Example 40 to give 4-(o-benzoylsulfimido)-pent-2-enoic acid dimethylamide (1.74 g.; 0.0056 mole) M.P. 138–139° (from ethyl acetate/light petroleum B.P. 60–80°). Two recrystallizations raised the melting point to 140–140.5°. Found: C, 53.89; H, 5.25; N, 9.42; S, 10.74%. $C_{14}H_{16}N_2O_4S$ requires C, 54.51; H, 5.23; N, 9.09; S, 10.40%.

A pharmaceutical composition containing this amide was made up with 1% aqueous "Tween" 80. The composition showed strong sedative activity, caused muscular incoordination and showed antagonism of the action of pentamethylene tetrazole in mice.

Example 42

4 - (o-benzoylsulfimido)-pent-2-enoic acid methylamide was prepared as follows:

The acid (2.0 g.; 0.0071 mole; Example 41) and triethylamine (0.99 cc.; 0.0071 mole) in dry tetrahydrofuran (50 cc.) were cooled in an ice bath, isobutylchloroformate (0.92 cc.; 0.0071 mole) added and the mixture stirred for 0.5 hr. After the addition of redistilled N-methylaniline (0.97 cc.; 0.0089 mole), stirring was continued for 1 hour and the mixture allowed to warm to room temperature (1 hr.) and evaporated to dryness in vacuo. The residue was taken up in chloroform and washed with diluted $H_2SO_4$ and aqueous $KHCO_3$ then dried. Distillation of the choroform gave a gum which, on crystallization from etheyl acetate/petroleum (B.P. 60–80°) gave 4-(o-benzoylsulfimido)-pent-2-enoic acid methylphenylamide (2.03 g.; 0.0055 mole) M.P. 103–105°. After recrystallization, M.P. 104–105°.

A pharmaceutical composition containing this amide was made up with 1% aqueous "Tween" 80. The composition showed moderate sedative activity, moderate potentiation of hexabarbitone, caused muscular incoordination and showed pentamethylene tetrazole antagonism in mice.

Example 43

4-(o-benzoylsulfimido)-pent-2-enoic acid ethylamide was prepared as follows:

The ethylamide was obtained from the acid (2.0 g.; 0.0071 mol, Example 41) by the method of Example 40, using 70% aqueous ethylamine, as an oily solid (2.33 g.) which crystallized from ethyl acetate/petroleum (B.P. 60–80°) (1.33 g.; 0.0043 mole; 61%) M.P. 105–106°. Recrystallization raised the M.P. 106–107°.

A pharmaceutical composition containing this amide was made up with 1% aqueous "Tween" 80. The composition showed strong sedative activity, moderate potentiation of hexabarbitone and strongly caused muscular incoordination in mice.

Example 44

4-(o-benzoylsulfimido)-hex-2-enoic acid dimethylamide was prepared as follows:

Hex-2-enoic acid (20.00 g.; 0.177 mole), N-bromosuccinimide (31.20 g.; 0.177 mole) and benzoyl peroxide (150 mg.) were heated under reflux for 1½ hours. The oil obtained by the procedure of Experiment 1 was distilled at 94–98°/0.4 mm. to give 4-bromohex-2-enoic acid (24.50 g.; 0.127 mole, 72%) $\mu_D^{20}$ 1.5130.

4-bromohex-2-enoic acid (20.0 g.; 0.104 mole) and sodium saccharin (21.2 g.; 0.104 mole) were heated on a steam bath in dimethylformamide (250 cc.) for 24 hours. The usual method of isolation gave a brown oil (27.5 g.) which afforded 4-(o-benzoylsulfimido)-hex-2-enoic acid (4.20 g.) M.P. 148–150°. A further crop (5.14 g.) M.P. 139–141 was obtained from the mother liquors, as well as saccharin (1.23 g.). Total yield 7.34 g.; 0.0249 mole. Recrystallization raised the M.P. 150–152°.

4-(o-benzoylsulfimido)-hex-2-enoic acid dimethylamide (28.01 g.; 0.0869 mole; 90%) M.P. 141.5–142.5 was obtained by the method of Example 40 from 4-(o-benzoylsulfimido)-hex-2-enoic acid (29.03 g.; 0.0983 mole). Two crystallizations from ethyl acetate/petroleum (B.P. 60–80°) gave M.P. 142.5–143°. Found: C, 55.89; H, 5.80; N, 8.75; S, 9.83%. $C_{15}H_{18}N_2O_4S$ requires C, 55.90; H, 5.63; N, 8.69; S, 9.94%.

A pharmaceutical composition containing this amide was made up with 1% aqueous "Tween" 80. The composition showed moderate sedative activity, moderate hexabarbitone potentiation, strongly caused muscular incoordination and antagonised pentylene tetrazole in mice.

Example 45

4-(o-benzoylsulfimido)-caproic acid t-butylamide was prepared as follows:

4(o-benzoylsulfimido)-hex-2-enoic acid (51.7 g.; 0.175 mole) in ethanol (520 cc.) was hydrogenated over platinum oxide (2.5 g.). (3780 cc. hydrogen absorbed, theoretical 4180 cc.). After removal of the catalyst and solvent, the residue (49.90 g.) was crystallized from benzene-petroleum (B.P. 60–80°) to give 4-(o-benzoylsulfimido)-caproic acid (33.0 g.; 0.111 mole) M.P. 85–89°.

4-(o-benzoylsulfimido)-caproic acid t-butylamide (1.55 g. 0.0044 mole; 62%) M.P. 136.5–138° was crystallized, ethyl acetate/petroleum (B.P. 60–80°), from the gum (2.25 g.) obtained by the method of Example 42, using tert-butylamine, from the hexanoic acid (2.11 g.; 0.0071 mole). Two further crystallizations gave M.P. 141–142°. Found: C, 57.98; H, 6.72; N, 7.78; S, 9.02%.

$C_{17}H_{24}N_2O_4S$ requires C, 57.94; H, 6.86; N, 7.95; S, 9.10%.

A pharmaceutical composition contatining this amide was made up with 1% aqueous "Tween" 80. The composition showed sedative activity in mice.

Example 46

4-(o-benzoylsulfimido)-caproic acid ethylamide was prepared as follows:

The ethylamide (2.86 g.; 0.00904 mole, 45%) M.P. 82–85° was crystallized (ethyl acetate/petroleum (B.P. 60–80°)) from the gum obtained from the hexanoic acid (5.95 g.; 0.02 mole) using the method of Example 43. Two crystallizations raised the M.P. to 85.5–86. Found: C, 55.52; H, 6.08; N, 8.73; S, 9.84%. $C_{15}H_{20}N_2O_4S$ requires C, 55.55; H, 6.22; N, 8.64; S, 9.88%.

A pharmaceutical composition containing this amide was made up with 1% aqueous "Tween" 80. The composition showed strong sedative activity and strong hexabarbitone potentiation and antagonised pentylene tetrazole in mice.

Example 47

4-(o-benzoylsulfimido)-caproic acid dimethylamide was prepared as follows:

(A) 4-(o-benzoylsulfimido)-hex-2-enoic acid dimethylamide (28.01 g.; 0.0869 mole) in ethanol (650 cc.) was hydrogenated over platinum oxide (1.5 g.) to give the corresponding hexanamide as a gum (28.0 g.) which could not be crystallized.

(B) 4-(o-benzoylsulfimido)-caproic acid (2.975 g.; 0.01 mole) was converted to the dimethylamide by the method of Example 40. The compound was obtained as an uncrystallizable gum (3.02 g.).

(C) The material of the foregoing preparations A and B was combined (31.03 g.) and chromatographed in 1:5-ether/benzene on Florisil (800 g.) to give an oil (23.05 g.) which was distilled at 195–205°/0.1 mm. to give the amide (15.92 g.) as a colourless gum which could not be induced to crystallize.

A pharmaceutical composition containing the amide was made up with 1% aqueous "Tween" 80. The composition showed strong sedative activity, strongly caused muscular incoordination and antagonised pentylene tetrazole in mice.

Example 48

4-(o-benzoylsulfimido)-3-methyl-but-2-enoic acid dimethylamide was prepared as follows:

3,3-dimethylacrylic acid (10.0 g.; 0.10 mole), N-bromo-succinimide (17.8 g.; 0.1 mole) and benzoyl peroxide (100 mg.) were heated under reflux for 2½ hours in carbon tetrachloride (100 cc.). The oil so obtained was distilled to give the bromo-acid (1.73 g.; 0.010 mole) B.P. 98–102°/0.8 mm. $n_D^{20}$ 1.5230.

Sodium saccharin (2.05 g.; 0.010 mole) and 4-bromo-3-methylbut-2-enoic acid (1.73 g.; 0.01 mole) were heated on a steam bath in dimethylformamide (25 cc.) for 48 hours. After cooling and pouring into water, isolation with chloroform gave a yellow solid (1.65 g.) which afforded 4-(o-benzoylsulfimido)-3-methylbut-2-enoic acid (1.24 g.; 0.0044 mole) M.P. 182–84° on crystallization from ethyl acetate/petroleum.

4-(o-benzoylsulfimido)-3-methylbut-2-enoic acid dimethylamide was obtained by the method of Example 42 as a yellow solid (1.55 g.) from the acid (1.59 g.; 0.00565 mole). Crystallization from ethyl acetate/petroleum gave 0.89 g.; 0.0029 mole; M.P. 135–136.5°.

A pharmaceutical composition containing this amide was made up with 1% aqueous "Tween" 80. This composition showed sedative activity, caused muscular incoordination and antagonised pentamethylene tetrazole in mice.

Example 49

4-(o-benzoylsulfimido)-pent-3-enoic acid dimethylamide was prepared as follows:

4-(o-benzoylsulfimido)-pent-3-enoic acid was prepared by base catalysed isomerisation of the corresponding α,β-unsaturated acid (see Example 41). It was frequently formed as the major product of the condensation of sodium saccharin with 4-bromopent-2-enoic acid. It was dissolved in trimethylamine and dry tetrahydrofuran, isobutyl chloroformate was added and the mixture was stirred for ½ hour followed by addition of dimethylamine and further stirring for an hour at 20° C. After evaporation to dryness in vacuo the gum obtained was crystallized from ethyl acetate-light petroleum and the product recrystallized several times from the same solvent to give 4-(o-benzoylsulfimido)-pent-3-enoic acid dimethylamide M.P. 119–120° C. Found: C, 54.74; H, 5.19; N, 9.09; S, 10.26%. $C_{14}H_{16}N_2O_4S$ requires C, 54.51; H, 5.23; N, 9.09; S, 10.4%.

A pharmaceutical composition containing this amide was made up with 1% aqueous "Tween" 80. The composition showed strong sedative activity, moderate potentiation of hexabarbitone and showed muscle incoordination activity in mice.

Example 50

N-methyl-4-phthalimidovaleramide was prepared as follows:

4-phthalimidovalerylchloride (Example 12) (10 g.) in benzene was treated with a slight excess of anhydrous ethereal methylamine. The solution was washed with dilute hydrochloric acid, potassium bicarbonate and water, dried and evaporated to a solid which was crystallized several times from 1:1 ethyl acetate light petroleum to give N-methyl 4-phthalimidovaleramide (1.0 g.), M.P. 105–6°. Found: C, 64.74; H, 6.21; N, 10.93. $C_{14}H_{16}N_2O_3$ requires C, 64.60; H, 6.20; N, 10.76%.

A pharmaceutical composition containing this amide was made up with aqueous "Tween" 80. The composition showed strong sedative activity, strongly potentiated hexabarbitone, showed muscle incoordination activity and antagonised pentamethylene tetrazole induced convulsions in mice.

Example 51

4-(o-benzoylsulfimido)-pent-2-enoic acid propylamide was prepared from the corresponding acid chloride (Example 41) and propylamine as in Example 50 with crystallization of the product from ethyl acetate-light petroleum, M.P. 109–110°. Found: C, 55.91; H, 5.75; N, 8.63. $C_{15}H_{18}N_2O_4S$ requires C, 55.89; H, 5.63; N, 8.69%.

A pharmaceutical composition containing this amide was made up with aqueous "Tween" 80. The composition showed strong sedative activity, potentiated hexabarbitone, showed muscle incoordination activity and antagonised pentamethylene tetrazole induced convulsions in mice.

Example 52

4-(o-benzoylsulfimido)-pent-2-enoic acid diethylamide was prepared from the acid (Example 41) (3.08 g.) by the mixed anhydride method using triethylamine (1.38 ml.), isobutylchloroformate (1.29 ml.) and a slight excess of diethylamine. The product (3.2 g.) crystallized slowly on standing and was recrystallized from ethyl acetate-cyclohexane to give the desired amide, M.P. 101–2°. Found: C, 57.12; H, 6.23; N, 8.26. $C_{16}H_{20}N_2O_4S$ requires C, 57.13; H, 5.99; N, 8.33%.

A pharmaceutical composition containing this amide was made up with 1% aqueous "Tween" 80. The composition showed strong sedative activity, potentiated hexabarbitone, showed muscle incoordination activity and antagonised pentamethylene tetrazole induced convulsions in mice.

We claim:

1. A 4-(o-benzoylsulfimido) hydrocarbon carboxylic acid amide having the formula

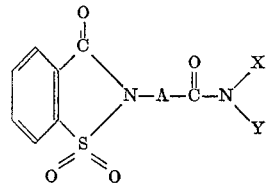

wherein A is a hydrocarbon chain unit of the group consisting of

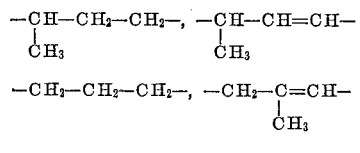

X is a lower alkyl radical, and Y is a member of the group consisting of hydrogen, lower alkyl, and phenyl.

2. 4-(o-benzoylsulfimido)-valeric acid dimethylamide.
3. 4-(o-benzoylsulfimido)-pent-2-enoic acid dimethylamide.
4. 4-(o-benzoylsulfimido)-pent-2-enoic acid N-methylanilide.
5. 4-(o-benzoylsulfimido)-pent-2-enoic acid ethylamide.
6. 4-(o-benzoylsulfimido)-hex-2-enoic acid dimethylamide.
7. 4-(o-benzoylsulfimido)-caproic ethylamide.
8. 4-(o-benzoylsulfimido)-caproic acid dimethylamide.
9. 4-(o-benzoylsulfimido)-pent-3-enoic acid dimethylamide.
10. 4-(o-benzoylsulfimido)-pent-2-enoic acid propylamide.
11. 4-(o-benzoylsulfimido)-pent-2-enoic acid diethylamide.
12. A compound according to claim 1 which is 4-(o-benzoylsulfimido)-butyric acid dimethylamide.
13. A compound according to claim 1 which is 4-(o-benzoylsulfimido)-but-2-enoic acid dimethylamide.
14. A compound to claim 1 which is 4-(o-benzoylsulfimido)-caproic acid t-butylamide.
15. A compound according to claim 1 which is 4-(o-benzoylsulfimido)-3-methyl-but-2-enoic acid dimethylamide.

References Cited

UNITED STATES PATENTS 3,352,880  11/1967  Miller et al. _____ 260—301

HENRY R. JILES, Primary Examiner

ALAN L. ROTMAN, Assistant Examiner

U.S. Cl. X.R.

260—247.1, 247.2, 268, 287, 293.4, 294, 295, 326; 424—248, 258, 267, 274